United States Patent [19]

Marshall

[11] Patent Number: 4,556,337

[45] Date of Patent: Dec. 3, 1985

[54] CONNECTOR FOR FRAMING SYSTEM

[75] Inventor: Stuart R. Marshall, Brighton, Australia

[73] Assignee: Framelock International Pty. Limited, Forestville, Australia

[21] Appl. No.: 473,095

[22] Filed: Mar. 7, 1983

[51] Int. Cl.$^4$ .............................................. B25G 3/00
[52] U.S. Cl. ...................................... 403/255; 52/665; 52/698; 403/297
[58] Field of Search .................. 52/690, 698, 488, 475, 52/36, 665; 403/405, 297, 194, 195, 187, 255

[56]  References Cited

U.S. PATENT DOCUMENTS

| | | | |
|---|---|---|---|
| 3,574,367 | 4/1971 | Jankowski | 403/297 |
| 3,829,226 | 8/1974 | Krensel | 403/297 |
| 4,076,438 | 2/1978 | Bos | 403/297 |
| 4,485,597 | 12/1984 | Worrallo | 52/690 |

FOREIGN PATENT DOCUMENTS

| | | | |
|---|---|---|---|
| 2108342 | 9/1972 | Fed. Rep. of Germany | 403/297 |
| 1361398 | 4/1964 | France | 403/297 |
| 2129259 | 10/1972 | France | 403/297 |
| 2508120 | 12/1982 | France | 403/297 |
| 2109500 | 6/1983 | United Kingdom | 403/297 |

Primary Examiner—Henry E. Raduazo
Attorney, Agent, or Firm—Fulwider, Patton, Rieber, Lee & Utecht

[57] ABSTRACT

A first tubular member having an axially extending central cavity with opposed substantially flat walls receives through its open end a connector which is adapted to be clamped against the opposed flat walls and to secure the end of the first tubular member against an exterior wall of a second tubular member which has a laterally directed undercut recess in a side wall thereof for engagement by corresponding portions of the connector. The connector has first and second substantially rigid legs with respective head portions with inclined surfaces which engage in the undercut recess in the side wall of the second tubular member so as to pull the tubular members together and hold them in the desired position; the rigid legs have respective tail portions at the opposite ends thereof from the head portions, and a connecting element has means for biasing apart the rigid legs and interconnects said tail portions and by virtue of recesses for receiving in push fit interengagement said tail portions.

8 Claims, 6 Drawing Figures

CONNECTOR FOR FRAMING SYSTEM

FIELD OF THE INVENTION

The present invention relates to connectors for interconnecting tubular members such as tubular members used in a framing system and wherein the end of a first tubular member is to be connected to an intermediate portion of the second tubular member to form a T-like junction. Such T-junctions in general may be at an acute angle or at 90°.

BACKGROUND TO THE INVENTION

The inventor's prior Australian Patent Specification No. 31152/77 (now Australian Patent No. 514,900) discloses a particular connector or securing clip for securing together first and second tubular members wherein the first tubular member has an axially extending central cavity with opposed substantially flat walls and the second member has a laterally directed undercut recess in a side wall; the securing clip is inserted into the end of the central cavity of the first tubular member and has head portions arranged to engage in a laterally directed undercut recess in the second tubular member. The securing clip disclosed has a pair of rigid legs which are spaced apart and in the securing position are positively pressed apart by a screw inserted through the side wall of the first tubular member to cause the legs to move into clamping relationship within the central cavity of the first tubular member, the head portions being at the tips of the legs and engaging in the undercut recess in the side wall of the second tubular member. The arrangement is constructed so as to cause the first tubular member to be pulled towards and into abutment with the side wall of the second tubular member. In the preferred embodiment disclosed in said specification, the legs are interconnected by a block of resilient foam rubber-like material secured by adhesive to the confronting sides of the rigid legs at a location remote from the head portions.

The teaching of said Australian Specification 31152/77 represents a development in the field, and more particularly is a development over and above the art cited as the nearest prior art, namely Australian Specifications Nos. 29259/67, 59668/65 and 2269/61 (now Patent No. 247,433).

SUMMARY OF THE PRESENT INVENTION

The present invention is directed to new and useful developments and alternatives over the prior art and, in particular, the prior art referred to above. The invention is especially concerned with developments to the mounting and interconnection of a pair of substantially rigid strip-like legs in a connector which is adapted to interconnect first and second tubular members, wherein the first tubular member has an axially extending central cavity with opposed substantially flat walls and the second tubular member has a laterally directed undercut recess in a side wall for receiving head portions of the rigid legs of the connector.

The present invention consists in such a connector which comprises first and second substantially rigid legs each of generally strip-like form and having a head portion at one end, a body portion and a tail portion at the opposite end, a connecting element interconnecting the legs and permitting relative movement thereof, whereby the legs can be pressed apart in a clamping operation by a screw having its shank inserted through a side wall of the first tubular member, and each leg including a substantially flat abutment surface adapted to be pressed into abutment with one of the substantially flat opposed walls of the central cavity of the first tubular member; the connector is characterised by the connecting element interconnecting the rigid legs at the tail portions thereof, the tail portions of the legs and the connecting element having complementary push fit interengagement means permitting assembly in a push fit operation and permitting motion of the legs relative to one another and relative to the connecting element such that the legs can move towards and away from one another, the connecting element providing biasing means for biasing apart said legs.

In a preferred embodiment of the invention, the tail portions of said legs comprise respective protuberant spines of part circular shape in cross-section, and comprising more than a semi-circle and the connecting element has a complementary recess such that pivotal motion of the legs about the axes their respective spines is facilitated.

With advantage the connecting element can be moulded in a resilient plastic material thereby facilitating a snap fit of the spines into the respective recesses and readily permitting the connecting element to provide the biasing means through its inherent shape and configuration.

The most preferred form of the biasing means in the connecting element is the provision of a pair of spring legs extending between said rigid legs and adapted to have tip portions engaging the corresponding rigid leg on an inner surface thereof whereby normally the legs are biased to a position displaced outwardly from a parallel configuration.

With great advantage the spring legs can have an integrally formed connecting strut for increasing the durability of the product and increasing the biasing force. Thus, by suitable dimensioning of the components the connector can have a spring effect whereby the connector is held within the first tubular member by friction yet its position can be readily adjusted before interconnection of the screw used in the clamping operation.

The rigid legs are preferably identical and cut from an extrusion, for example of aluminium. Thus, the connector can have any desired dimension, i.e. width to the strip-like legs and, indeed, can be cut at an angle to suit an angled T-joint.

The advantages of the present invention, at least in a preferred embodiment, include the following:

(a) moulding the connecting element out of plastic material can be effected very economically and simply with a high degree of accuracy;

(b) the connecting element and the legs can be very easily and quickly assembled simply by a push fit avoiding the expense, slowness and quality control problems of adhesive operations;

(c) a high degree of durability can be provided;

(d) should one of the rigid legs become damaged, it can readily be removed and a substitute leg inserted in a push fit operation; and (e) a high degree of biasing force can readily be designed into the components and readily the legs can be designed to be normally biased so as to diverge away from one another so that the connector is held by frictional forces upon initial insertion into a tubular member.

BRIEF DESCRIPTION OF THE DRAWINGS

A preferred embodiment of the invention will now be described with reference to the accompanying drawings, of which.

Figure 1:
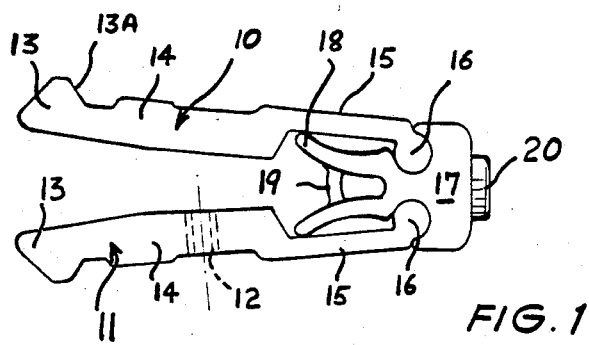
FIG. 1 is a plan view of a connector embodying the invention.
Figure 2:
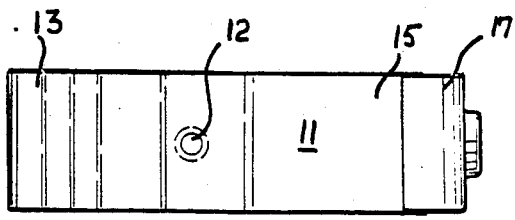
FIG. 2 is front elevation of a connector of FIG. 1.
Figure 3:
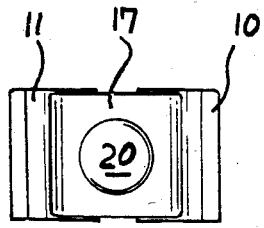
FIG. 3 is an end view of the connector of FIG. 1 from the right hand side.
Figure 4:
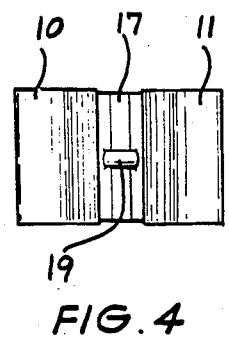
FIG. 4 is an end view of the connector of FIG. 1 from the left hand side.

The connector shown in the drawings comprises a pair of virtually identical extruded aluminium strip-like rigid legs 10 and 11, although one of the legs 11 has a screw-threaded bore 12 for receiving a clamping screw described below. Each rigid leg comprises an enlarged head portion 13, a central body portion 14 and a tail portion comprising a flat abutment surface 15 and a protuberant spine 16 of part circular cross-sectional shape. The flat surface 15 is in a plane spaced outwardly from the plane containing the outer face of the body portion 14.

The connector includes a moulded plastic resilient clip 17 which includes, in each side, a part cylindrical recess for accommodating in snap fitting relationship the respective spines 16, and a pair of spring legs 18 which are outwardly curved when seen in plan view and diverge from one another to terminate in respective tips which engage the interior of the tail portion of each rigid leg. A stiffening strut 19 extends between the two spring legs 18 to increase the resilient biasing effect.

The plastic clip 17 also includes a circular shaped boss 20 projecting from the end face, this boss primarily simply being the point of introduction of plastic into the mould but also the boss can have a secondary function of being able to centre a helical compression spring if the clip is used with such a spring for positioning purposes in any particular tube.

The interconnection between each spine 16 and the corresponding recess in the clip 17 can be established either by sliding the spine along the recess from one end or alternatively snap fitting the spine laterally into position. The interconnection is such that each leg can pivot about the axis of its spine, and furthermore when the legs are pressed apart by a screw as described below, the initial tightening of the screw causes spreading of the head portions 13 which engage in the corresponding undercut recesses in the second tube; the arrangement, as described below, is such that the connector and thus the first tube are drawn towards the second tube to cause abutment between the tubes. Further tightening of the screw then tends to cause the tail portions of the legs to be spaced apart, resilience in the plastic clip permitting this action, and causes the final step of clamping to take place, namely the flat surfaces 15 being pressed into abutment with corresponding faces of the first tube.

Figure 5:
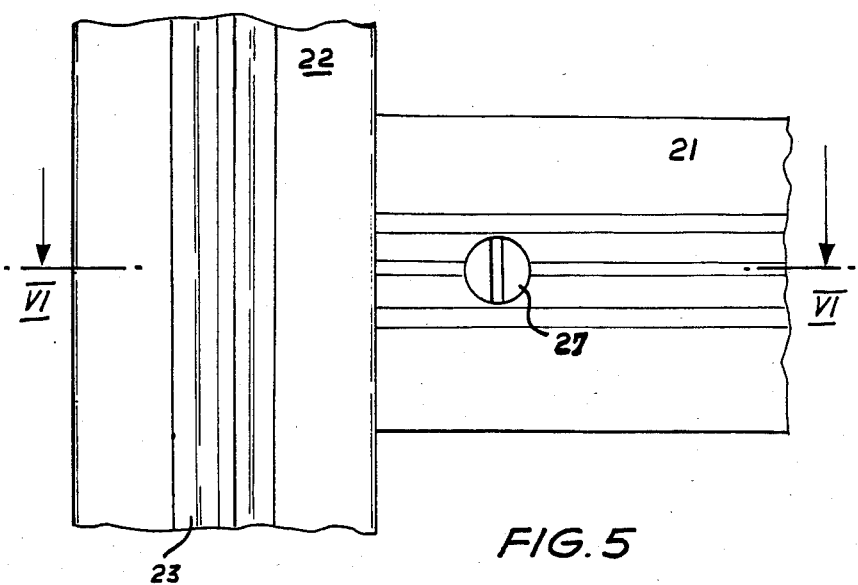
FIG. 5 is an illustration of a T-joint formed from two tubular members connected by a connector in accordance with FIGS. 1 to 4.
Figure 6:
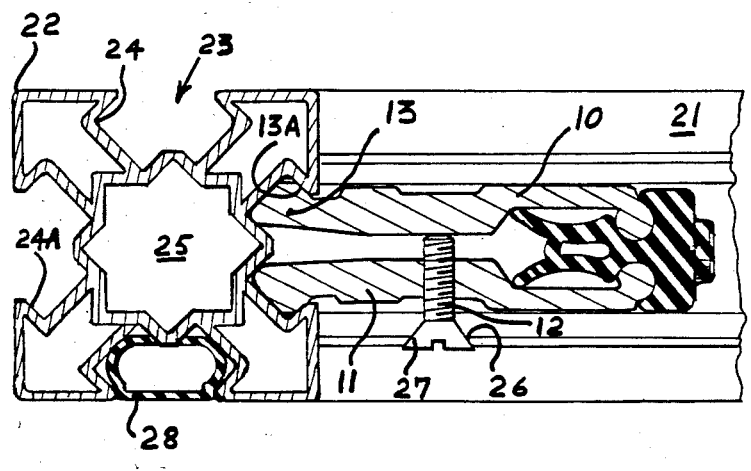
FIG. 6 is a cross-sectional view taken along the lines VI—VI of the FIG. 5.

Reference will now be made to FIGS. 5 and 6 to show an application of the clip to securing together identical tube sections 21 and 22 to form a T-junction.

In the illustrated embodiment, each tube is extruded in aluminium in accordance with a particular preferred shape also invented and developed by the present applicant, the tube having an overall square shape with a recess 23 in each side wall having undercuts 24 for accommodating the head portions 13 of the connector; an internal cavity 25 is provided in the centre of the tube section for accommodating a connector. It will be seen that the internal cavity 25 has sets of side faces disposed in first and second square arrays at 45° to one another, thereby permitting the tubes to be joined in a T-junction but with the tube 21 rotated through an angle of 45°.

FIG. 6 illustrates the assembly of a joint in its final stage. Prior to assembly, a clearance bore 26 is drilled through a side wall of the tube 21 at the appropriate point, the connector is inserted into the end of the tube, and a screw 27 with a counter sunk head is engaged and screwed through the threaded bore 12 in the leg 11 so that the tip engages the interior face of the opposite leg 10. The use of a counter sunk screw compensates for any tolerance in the position of the bore 26.

The tube 21 is offered up to the tube 22 and the head portions 13 of the legs inserted into the undercut recess 23. The screw 27 is then tightened, the inclined face 13A of each head portion engaging on the inclined surfaces 24A to pull the connector towards the tube 22 and thus to pull the tube 21 into abutment with the tube 22. Further tightening of the screw 27 tends to spread the tail portions of the legs to clamp against the interior walls of the tube 21.

Instead of using a screw of the type shown in FIGS. 5 and 6, a self-tapping screw could be inserted at right angles to the direction of the screw 27 in the drawing to project between the spaced legs, the self-tapping screw having a taper whereby spreading of the legs is established with the screw cutting its own thread on the interior faces of the legs 10 and 11.

FIG. 6 also illustrates a flexible plastic or rubber capping strip 28 which can be used to close any of the recesses 23 in the side wall of the tubes. However, the recesses can be used for other purposes such as engaging glass sheets or panels.

I claim:

1. A connector for interconnecting first and second tubular members, wherein the first tubular member has an axially extending central cavity with opposed substantially flat walls and the second tubular member has a laterally directed undercut recess in a side wall for engagement with the connector, the connector comprising first and second substantially rigid legs each of generally strip-like form and having a head portion at one end, a body portion and a tail portion at the opposite end, a connecting element interconnecting the legs and permitting relative movement thereof, whereby the legs can be pressed apart in a clamping operation by a screw having its shank inserted through a side wall of the first tubular member, and each leg including a substantially flat abutment surface adapted to be pressed into abutment with one of the substantially flat opposed walls of the central cavity of the first tubular member, at least a rear portion of said abutment surface being adjacent the tail portion; the connector is characterised by the connecting element interconnecting the rigid legs at the tail portions thereof, the tail portions of the legs having respective bulbous projections directed towards one another and the connecting element being a resilient structure and having complementary push fit interengagement cavities permitting assembly with the bulbous projections in a push fit operation and permitting motion of the legs relative to one another and relative to the connecting element such that the legs can move towards and away from one another, the connecting element providing biasing means for biasing apart said legs and the connecting element permitting said rear portions to be displaced away from one another for clamping the connector within the first tubular member.

2. A connector as claimed in claim 1, and wherein the bulbous projections of said legs comprise respective protuberant spines of part circular shape in cross-section and comprising more than a semi-circle and the connecting element has a complementary recess such that pivotal motion of the legs about the axes of their respective spines is facilitated.

3. A connector as claimed in claim 2, and wherein the connecting element is a unitary moulded plastics body which is resiliently deformable, said biasing means being provided by the shape and configuration of the connecting element which is resiliently deformable.

4. A connector as claimed in claim 3, wherein said biasing means comprises a pair of spring legs extending between said rigid legs with tip portions of the spring legs engaging rigid legs on an inner surface thereof, the spring legs having a shape and configuration to displace the rigid legs to diverge from one another in the direction towards the head portions thereof.

5. A connector as claimed in claim 4, and wherein a strut extends between and is integrally formed with said spring legs.

6. A connector as claimed in claim 3, and wherein said rigid legs are formed by transversely cutting an aluminium extrusion, the same extrusion being used for both legs.

7. A connector as claimed in claim 3, and in combination with a screw having a counter sunk head, and one of said rigid legs having a screw-threaded bore into which said screw threadably engages in the body portion thereof.

8. A joint formed between a first tubular member having its end secured in abutting relationship to the side wall of a second tubular member, the first tubular member having an axially extending central cavity with opposed substantially flat walls and the second tubular member having a laterally directed undercut recess in a side wall, the joint further comprising a connector comprising first and second substantially rigid legs each of generally strip-like form and having a head portion at one end, a body portion and a tail portion at the opposite end, said head portions of the legs being shaped and dimensioned to engage in said undercut recess and the connector further comprising a connecting element interconnecting the legs and permitting relevant movement thereof, and each leg including a substantially flat abutment surface pressed into abutment with a respective one of said substantially flat opposed walls of the central cavity of the first tubular member, a screw extending through a side wall of the first tubular member and being threadably engaged with the connector to spread apart said rigid legs to interengage said head portions in said undercut recess and to press said flat abutment surfaces against said flat opposed walls, at least a rear portion of said abutment surface of each leg being adjacent the tail portion; the connector is characterized by the connecting element interconnecting the rigid legs at the tail portions thereof, the tail portions of the legs having respective bulbous projections directed towards one another and the connecting element being a resilient structure and having complementary push fit interengagement cavities permitting assembly with the bulbous projections in a push fit operation and permitting motion of the legs relative to one another and relative to the connecting element such that the legs can move towards and away from one another, the connecting element providing biasing means for biasing apart said legs and the connecting element permitting said rear portions to be displaced away from one another for clamping the connector within the first tubular member.

* * * * *